United States Patent
Abe et al.

(10) Patent No.: US 7,993,450 B2
(45) Date of Patent: Aug. 9, 2011

(54) METHOD FOR REMOVAL OF UNBURNED CARBON IN FLY ASH

(75) Inventors: Kazuo Abe, Tokyo (JP); Takao Suzuki, Tokyo (JP); Hitoshi Koyama, Tokyo (JP); Kazuyoshi Matsuo, Ichihara (JP); Shinichiro Saito, Kumagaya (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 655 days.

(21) Appl. No.: 11/991,465

(22) PCT Filed: Dec. 13, 2006

(86) PCT No.: PCT/JP2006/324831
§ 371 (c)(1),
(2), (4) Date: Mar. 5, 2008

(87) PCT Pub. No.: WO2007/072718
PCT Pub. Date: Jun. 28, 2007

(65) Prior Publication Data
US 2009/0223415 A1    Sep. 10, 2009

(30) Foreign Application Priority Data
Dec. 22, 2005 (JP) .................................. 2005-370461

(51) Int. Cl.
*C04B 18/08* (2006.01)

(52) U.S. Cl. .................. 106/705; 106/DIG. 1; 209/164; 209/166; 366/12; 366/241; 366/244

(58) Field of Classification Search .................. 106/705, 106/DIG. 1; 209/164, 166; 366/12, 241, 366/244
See application file for complete search history.

(56) References Cited

U.S. PATENT DOCUMENTS

2009/0008302 A1 *  1/2009  Matsuo et al. ................ 209/166
2009/0301938 A1 * 12/2009  Matsuo et al. .................... 209/2

FOREIGN PATENT DOCUMENTS

| JP | 63-104668 A | 5/1988 |
| JP | 63-143928 A | 6/1988 |
| JP | 11-278914 A | 10/1999 |
| JP | 3613347 B1 | 11/2004 |

* cited by examiner

*Primary Examiner* — Paul Marcantoni
(74) *Attorney, Agent, or Firm* — Kubovcik & Kubovcik (57) ABSTRACT

The object is to remove unburned carbon in a fly ash in a stable and economically advantageous manner. A fly ash, water and a trapping agent are mixed together in a hybrid mixer (2), a shearing force is applied to the mixture to prepare a slurry containing surface-modified unburned carbon within a short time, a foaming agent is added to the slurry, and then the unburned carbon is separated by performing flotation separation in a flotator (11).

4 Claims, 10 Drawing Sheets

METHOD FOR REMOVAL OF UNBURNED CARBON IN FLY ASH

BACKGROUND OF THE INVENTION

1. Field of the Invention

The invention relates to a method for removing unburned carbon from fly ash, in particular a method for removing unburned carbon contained in fly ash discharged from coal fired power plants.

2. Description of the Related Art

Coal can be stably utilized as an energy source in the long term as the ratio of its proven reserves to annual production is more than 200 years. Therefore, the ratio of coal fired power generation to total power generation has been increasing year by year and the amount of coal ash generated (hereinafter referred to as "fly ash") is expected to increase in the future.

In such circumstances, the large amount of fly ash needs to be efficiently utilized from the viewpoints of environmental conservation and the effective utilization of resources.

At present, fly ash is used as a cement admixture after having the unburned carbon removed from it. The quality of fly ash can be improved by increasing the removal rate of unburned carbon, which then enables the amount of fly ash used to be increased.

Figure 8:
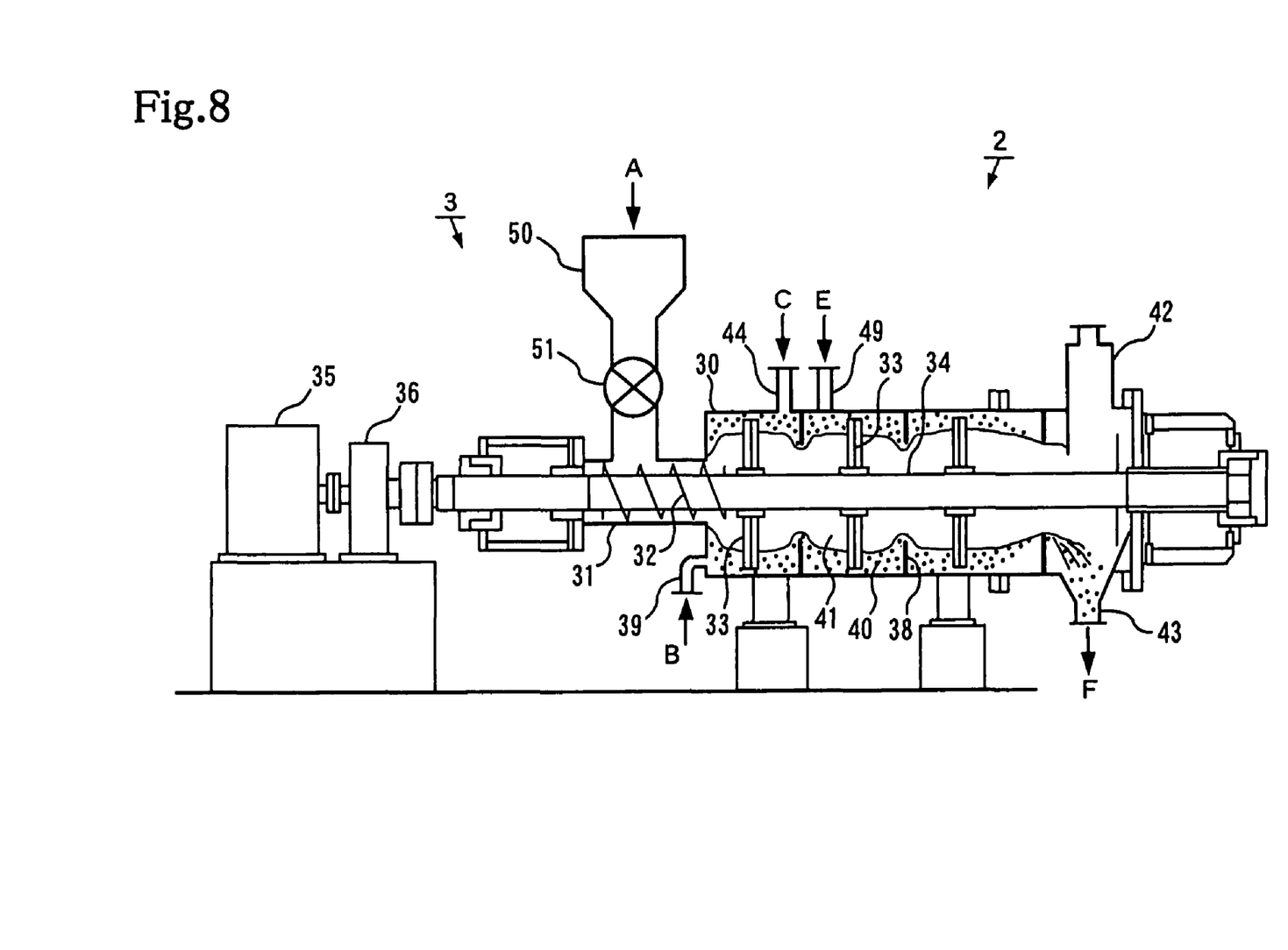
FIG. 8 is a cross sectional view illustrating a structure of a hybrid mixer shown in FIG. 7.

Therefore, the applicant has invented the method shown in FIG. 8, where slurry is generated by adding water to fly ash 61 in a mixing tank 62, a shearing force is applied to the slurry in a submerged stirrer 63 and then the unburned carbon in fly ash is efficiently removed in a floatation unit 67 (Refer to Patent document 1).

Patent document 1: Japan Patent No. 3613347

In the method described in Patent document 1, however, there has been concern that during the process of preparing slurry by adding water to fly ash, the required amount cannot be attained because fly ash adheres inside the feeding pipe and mixing tank, and moreover operation must be stopped because of the clogging of the pipe.

Figure 9:
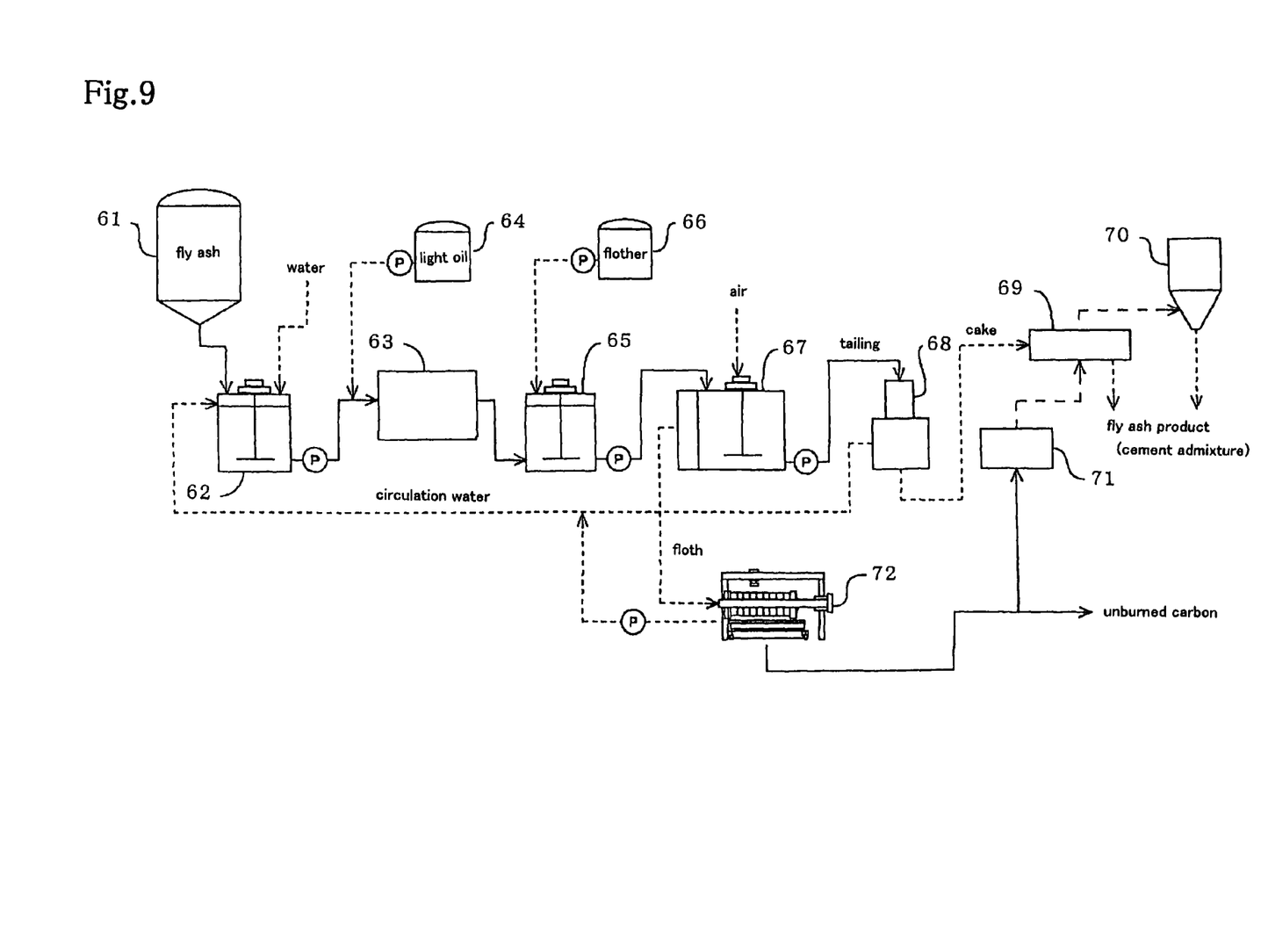
FIG. 9 is a schematic diagram of a conventional plant system.
Figure 10:
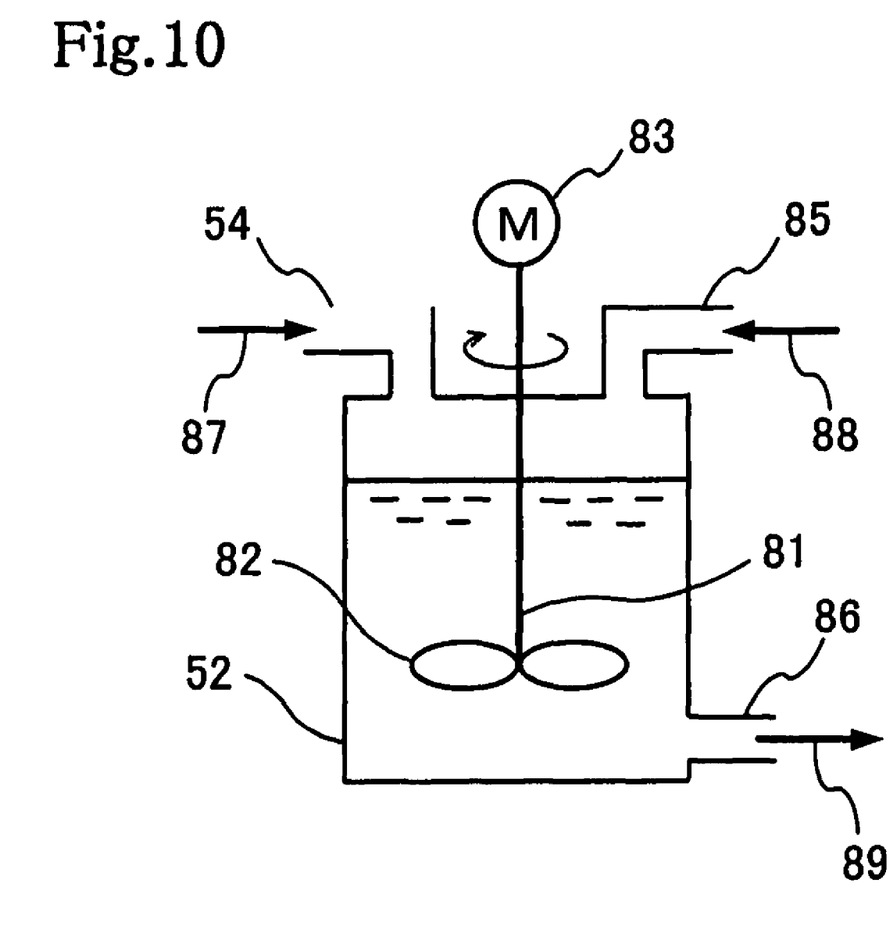
FIG. 10 is a cross sectional view of a mixing tank according to a conventional plant system.

Specifically, when slurry 89 is attempted to be generated by stirring fly ash 87 and water 88 in the mixing tank 62 shown in FIG. 9, there has been problems that the fly ash 87 and the water 88 is insufficiently mixed because of the fly ash 87 adhering around the rotary shaft 81 of stirring blades 82 and that the fly ash 87 becomes wet because of water or water vapor in the mixing tank 52, resulting in clogging of a feeding pipe 84.

BRIEF SUMMARY OF THE INVENTION

The present invention has been made in view of such problems and the objective of the invention is to provide a method for efficiently and easily removing unburned carbon from fly ash.

The invention according to Claim 1 and in order to achieve the above-mentioned objective is a method for removing unburned carbon from fly ash, wherein slurry is prepared by mixing fly ash and water in a hybrid mixer; a shearing force is applied to the slurry while adding a capturing agent; the unburned carbon is separated from fly ash by flotation in such a way that the slurry to which a shearing force was applied is stirred while supplying air thereto after adding a foaming agent the slurry.

The invention according to Claim 2 is a method for removing unburned carbon from fly ash, wherein slurry is prepared by mixing fly ash and water in a hybrid mixer; a shearing force is applied to the slurry while adding a capturing agent and a foaming agent thereto; the unburned carbon is separated from fly ash by flotation by stirring the slurry to which a shearing force was applied while supplying air thereto.

The invention according to Claim 3 is the method for removing unburned carbon from fly ash described in Claim 1 or 2, wherein the hybrid mixer is composed of a lateral cylindrical mixer body, a cylindrical body that communicates with one end of the mixer body and a volumetric feeder that communicates with the cylindrical body and is erected thereon; the mixer body is provided with a rotary shaft on which a plurality of stirring blades are mounted at constant intervals, baffle plates disposed on the inner surface of the mixer body in such a way that each babble plate is located between the stirring blades, supply ports that supply water and a capturing agent into the mixer body respectively and an exhaust air port and a discharge port on the other end of the mixer body; the cylindrical body is provided with a screw feeder coupled to the rotary shaft; and wherein fly ash is supplied to the cylindrical body by the volumetric feeder, the supplied fly ash is fed into the mixer body by the screw feeder, the fed fly ash is mixed and stirred between the stirring blades and the baffle plates after adding the water and the capturing agent thereto, and then is discharged through the discharge port.

The invention according to Claim 4 is the method for removing unburned carbon from fly ash described in Claim 3, wherein the volumetric feeder is composed of a hopper for receiving fly ash and a rotary valve for cutting off the predetermined amount of the fly ash from the hopper.

The invention according to Claim 5 is the method for removing unburned carbon from fly ash described in Claim 3, wherein the volumetric feeder is a screw feeder erected on the cylindrical body.

The invention according to Claim 6 is the method for removing unburned carbon from fly ash described in Claim 3, wherein the cylindrical body is provided with a first screw feeder coupled to the rotary shaft and a second screw feeder disposed in parallel with the first screw feeder and having a communication part with the mixer body as the end thereof.

The invention according to Claim 7 is the method for removing unburned carbon from fly ash described in Claim 3, wherein the cylindrical body is provided with a screw feeder that is rotated by a driving means different from that of the rotary shaft.

According to a method for removing unburned carbon from fly ash in accordance with the present invention, fly ash does not adhere inside a pipe or a mixing tank and furthermore it does not clog the pipe.

In addition, both the preparation of slurry and the application of a shearing force to the slurry can be performed in a single machine, thus enabling stable operation of the machine to be maintained, as well as reducing the cost of equipment and the area for installation. Therefore, an economically advantageous method for removing unburned carbon from fly ash can be provided.

DETAILED DESCRIPTION OF THE INVENTION

Figure 1:
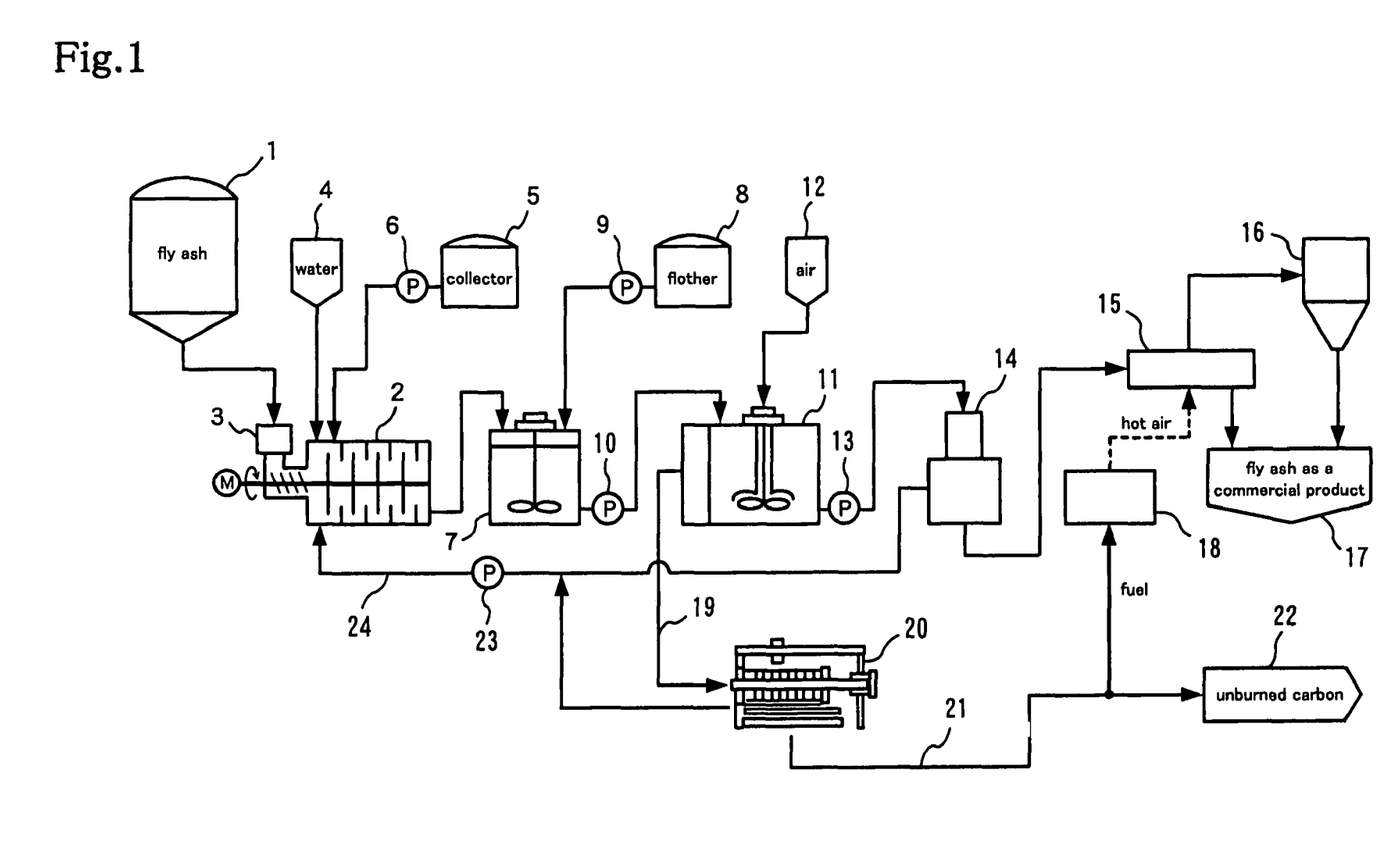
FIG. 1 is a schematic diagram of a plant system according to an embodiment of the present invention.

An embodiment according to the present invention will be described in reference to FIG. 1. FIG. 1 shows a schematic diagram of a plant system for implementing the present invention.

The system is mainly composed of a hybrid mixer 2 that prepares slurry from fly ash and water and applies a high shearing force to the slurry while adding a capturing agent thereto; a floatation unit 11 that separates unburned carbon from fly ash by adding a foaming agent to the slurry generated in the hybrid mixer 2 to generate air bubbles and then making the unburned carbon in the fly ash attach to those air babbles and float on with them; a solid-liquid separator 14 that separates the fly ash from sediment separated by the floatation unit 11 to recover it; and a dehydrator 20 that recovers the unburned carbon by dehydrating floating substances separated by the floatation unit 11.

Main pieces of equipment composing the system are described in detail below.

A fly ash tank 1 is provided for storing and supplying fly ash discharged from a coal fired power plant (not shown). Unburned carbon that remains unburned upon combustion of coal in a boiler of a coal fired power plant adheres to or is contained in the fly ash.

A capturing agent tank 5 is provided for storing and supplying a capturing agent and the capturing agent is supplied via a capturing agent pump 6. As the capturing agent, kerosene, diesel oil or heavy oil may be used.

The hybrid mixer 2 is provided for mixing fly ash supplied via a volumetric feeder 3 from the fly ash tank 1 and water supplied from a water feeder 4 to prepare slurry, as well as for adding the capturing agent from the capturing agent tank 5 to the slurry and stirring them, thus applying a high shearing force to the slurry and modifying the surface of the unburned carbon.

Figure 2:
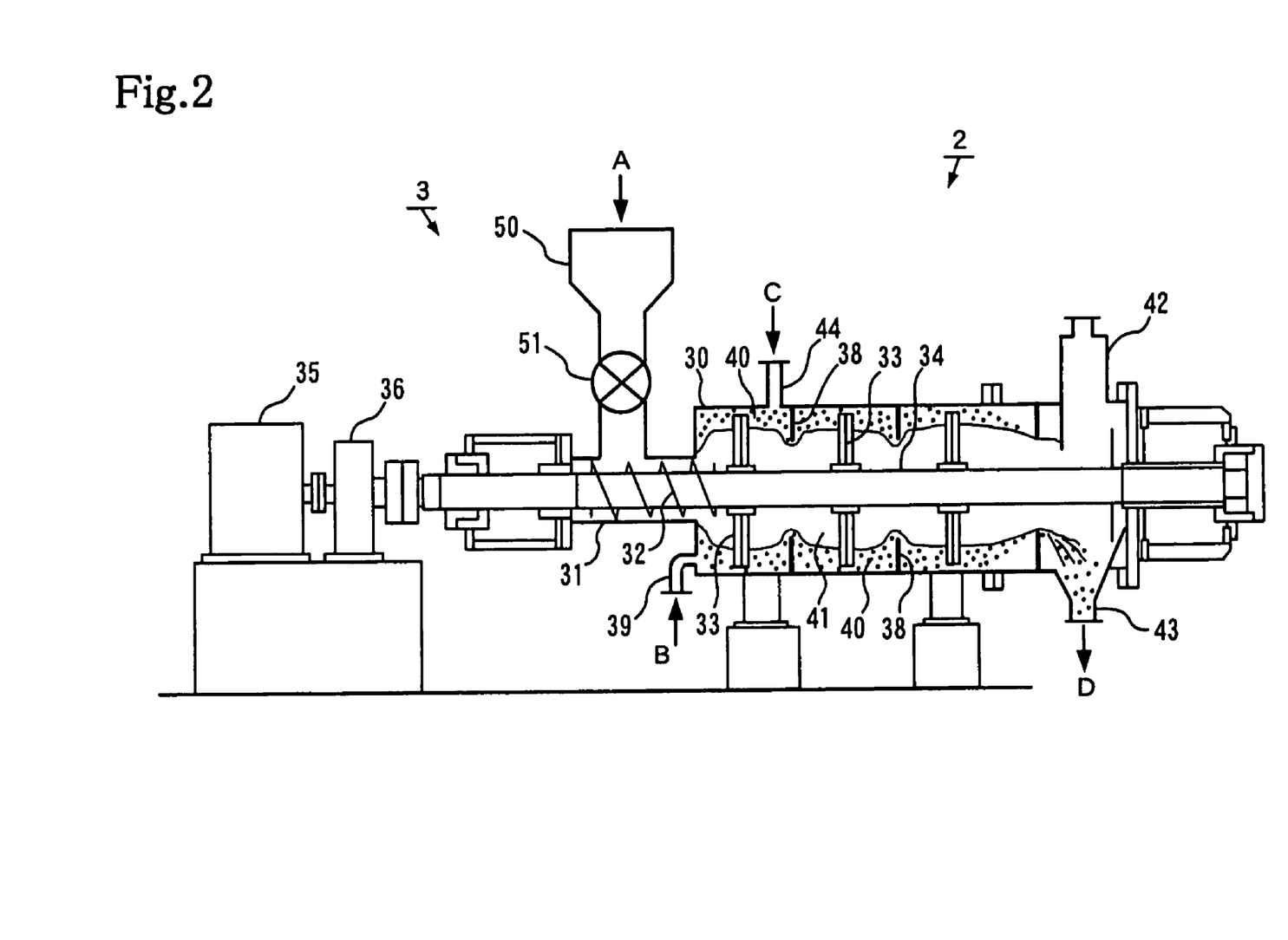
FIG. 2 is a cross sectional view illustrating a structure of a hybrid mixer shown in FIG. 1, according to a first embodiment.

FIG. 2 shows a hybrid mixer according to a first embodiment. FIG. 2 shows a cross sectional view illustrating a structure of the hybrid mixer 2 according to the first embodiment and also shows a volumetric feeder 3.

The hybrid mixer 2 is composed of a lateral cylindrical mixer body 30; a cylindrical body 31 that communicates with the mixer body 30 at its one end; and a volumetric feeder 3 composed of a hopper 50 and a rotary valve 51.

The mixer body 30 is provided for mixing fly ash and water to prepare slurry, as well as for adding a capturing agent to the slurry, mixing and stirring the slurry with rotary blades thus applying a high shearing force to the slurry. For this purpose, a plurality of stirring blades 33 are erected at constant intervals in the outward radial direction on a rotary shaft 34 disposed in the center of the mixer body 30, and baffle plates 38 are erected in the inward radial direction on the inner surface of the mixer body 30 in such a way that each baffle plate 30 is located between two adjacent stirring blades 33.

Figure 3:
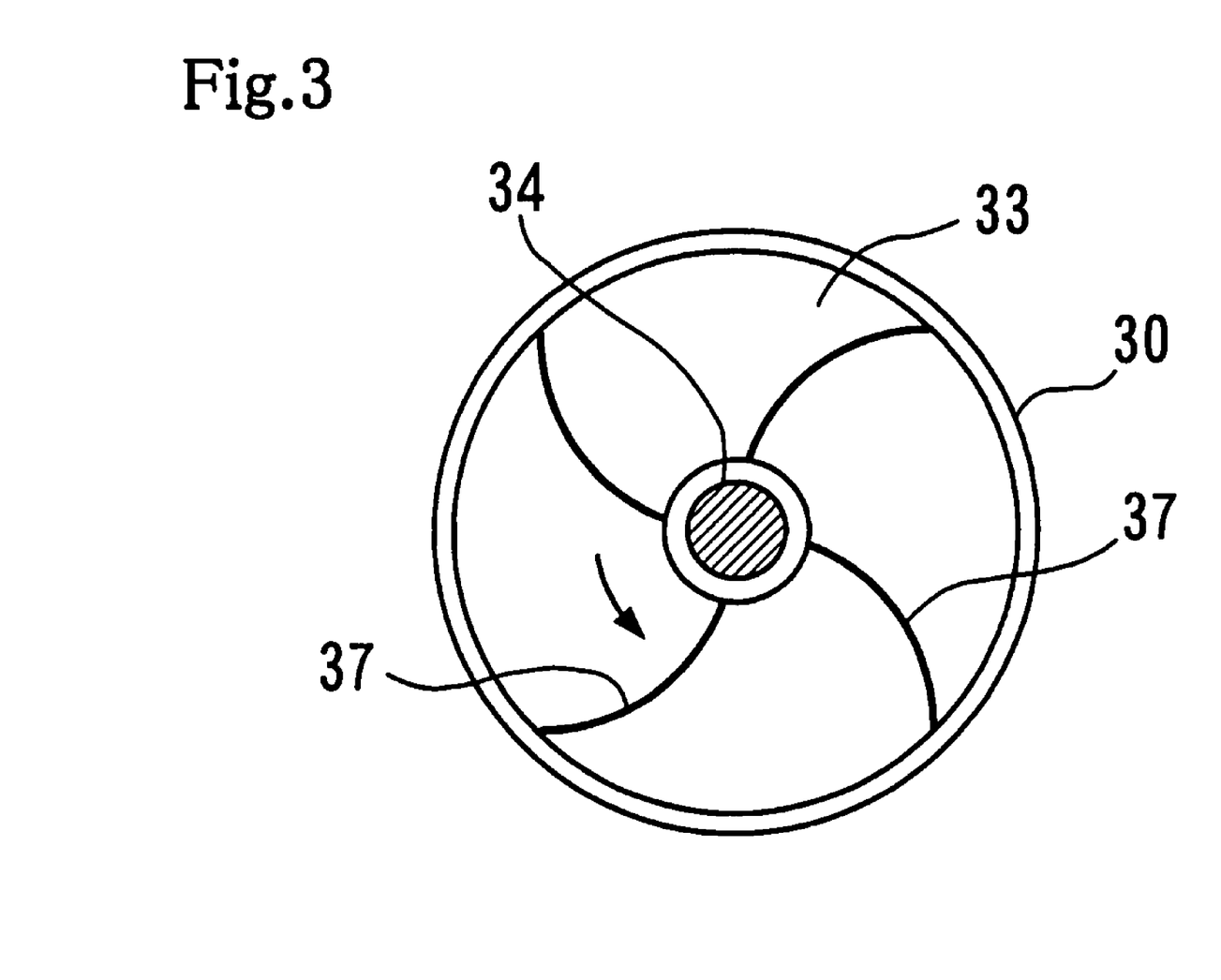
FIG. 3 is a plane view illustrating an example of a stirring blade of a hybrid mixer.

As shown in FIG. 3, for example, a discoid shape stirring blade 33 provided with turbine blades 37 on its surface can increase the efficiency of mixing and stirring, although various shapes as the stirring blade may be considered.

The cylindrical body 31 is provided for supplying fly ash to the mixer body 30 and has a lateral screw feeder 32 coupled to the rotary shaft 34 inside.

On the axial prolongation of the cylindrical body 31 and the mixer body 30, provided are an electric motor 35 that is a driving means for rotating the rotary shaft 34 and a reduction gear 36.

The hopper 50 and the rotary valve 51 composing the volumetric feeder 30 are erected almost vertically on the upper part of the cylindrical body 31.

Operation of the hybrid mixer 2 according to the embodiment will be described below.

Fly ash from the fly ash tank 1 is received in the hopper 50 and the predetermined amount of the fly ash is cut off by the rotary valve 51 and fed to the lateral screw feeder 32 in the cylindrical body 31. With the rotation of the lateral screw feeder 32 driven by the electric motor 35, the fly ash is gradually supplied into the mixer body 30, where the fly ash is mixed with water B supplied through a medium liquid supply port 39 from a water feeder 4 to generate slurry 40.

To the generated slurry 40, a capturing agent C is added through a capturing agent supply port 44 from the capturing agent tank 5 and the slurry 40 to which the capturing agent was added is mixed and stirred vigorously with the stirring blades 33, thus applying a high shearing force to the slurry 40. When the slurry 40 being mixed and stirred, the fly ash does not adhere to the rotary shaft 34 since the slurry 40 is pressed against the inner surface of the mixer body 30 due to centrifugal force of the rotary shaft 34, resulting in a gap 41 around the rotary shaft 34.

The slurry 40 gradually moves downward while being mixed and stirred between the stirring blades 33 and the baffle plates 38 as the baffle plates 38 prevents the slurry 40 from short-passing, and finally being discharged as slurry D through a discharge port 43. Gas components such as air moving along with the fly ash will be discharged outside through an exhaust air port 42.

Due to such a structure, the fly ash before being supplied into the mixer body 30 is separated from water and air containing water vapor by the lateral screw feeder 32. Therefore, there is little possibility that the fly ash may become wet and clog the rotary valve 51, the cylindrical body 31 and the like. Furthermore, as described above, this structure can prevent the disadvantageous case where the generated amount of slurry 40 is insufficient because of the fly ash adhering to the rotary shaft 34.

Figure 4:
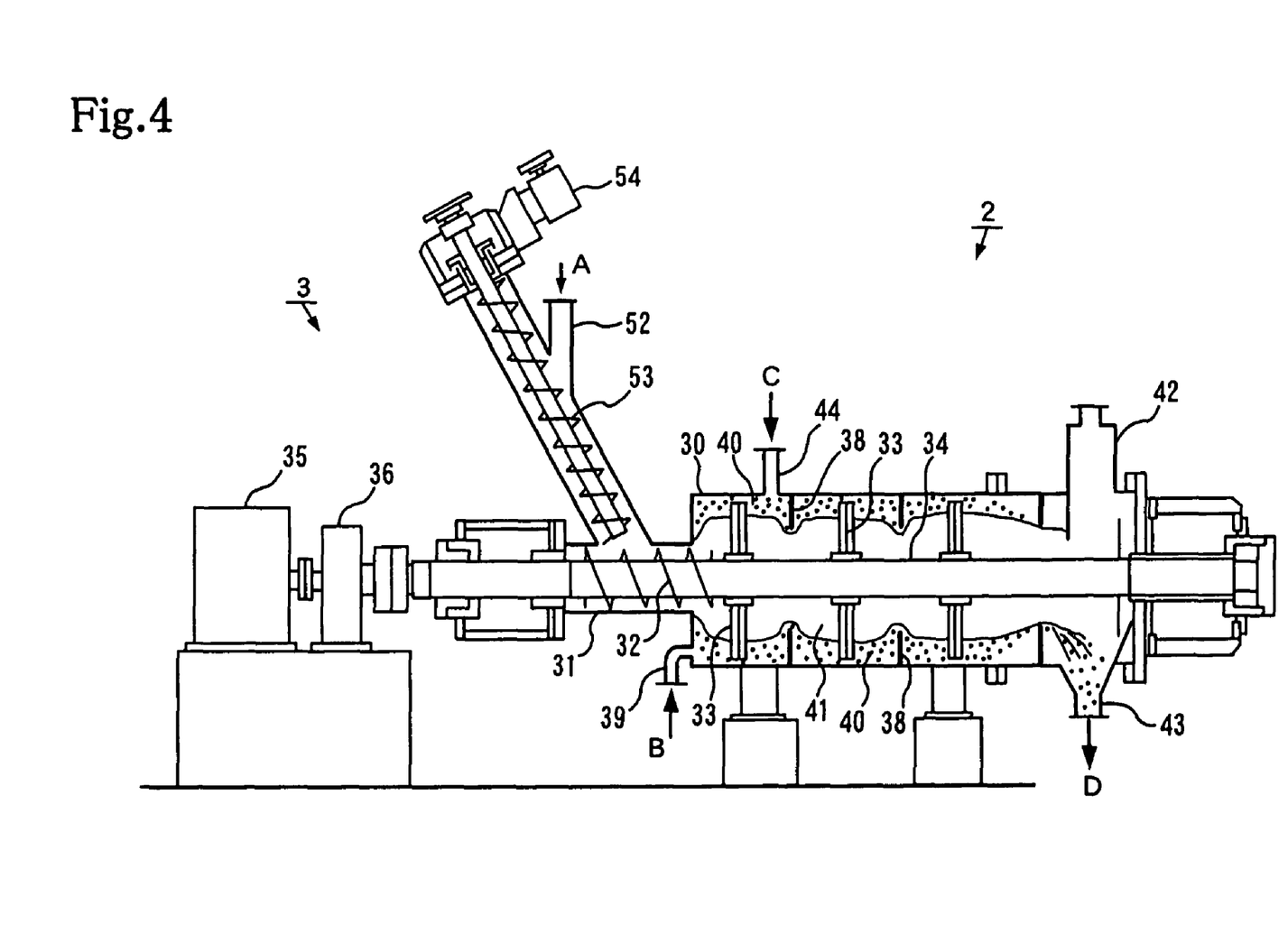
FIG. 4 is a cross sectional view illustrating a structure of a hybrid mixer shown in FIG. 1, according to a second embodiment.

FIG. 4 shows a hybrid mixer 2 according to a second embodiment. FIG. 4 shows a cross sectional view of the hybrid mixer 2 according to the second embodiment and the same symbols are given to the same parts as those shown in FIG. 2.

The hybrid mixer 2 according to the present embodiment differs from the hybrid mixer 2 according to the first embodiment shown in FIG. 2, in that an inclined screw feeder 53 having a solid supply port 52 on its upper part composes a volumetric feeder 3.

The inclined screw feeder 53 is erected in an inclined state or almost vertically on a cylindrical body 31 and an electric motor 54 for rotating the inclined screw feeder 53 is disposed on its uppermost part.

Operation in a mixer body 30 is the same as that of the first embodiment. The method for supplying fly ash to the mixer body 30 will be described below.

Fly ash A from a fly ash tank 1 is supplied through the solid supply port 52 to the inclined screw feeder 53, and then fed to a cylindrical body 31 in a lower part with the rotation of the screw feeder 53. In the cylindrical body 31, fly ash is fed to a lateral screw feeder 32 and is gradually supplied into the mixer body 30 with the rotation of the lateral screw feeder 32.

In the hybrid mixer 2 according to the embodiment, the two screw feeders 32 and 58 ensure that the fly ash can be supplied to the mixer body 30 without the fly ash being deposited to inner walls.

Figure 5:
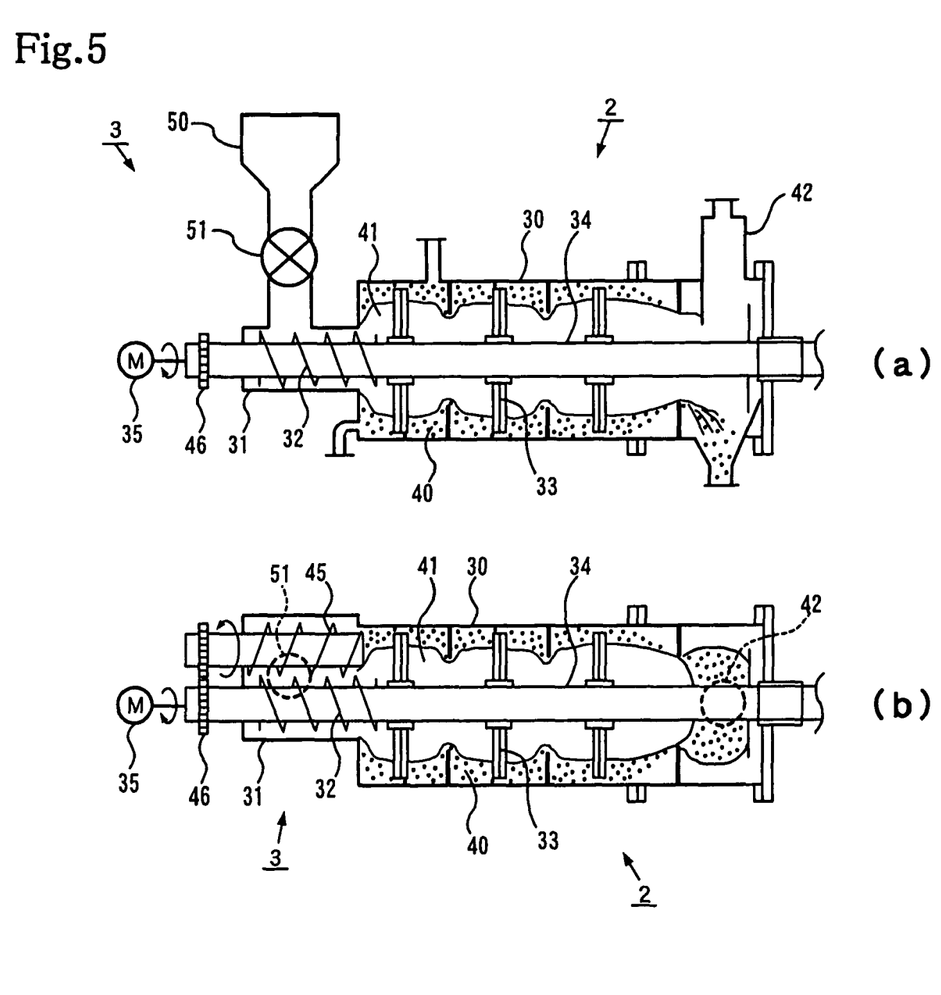
FIG. 5 are cross sectional views illustrating a structure of a hybrid mixer shown in FIG. 1, according to a third embodiment.

FIG. 5 show a hybrid mixer 2 according to a third embodiment. FIG. 5 show cross sectional views illustrating a structure of the hybrid mixer 2 according to the third embodiment; FIG. 5(*a*) is its side cross sectional view and FIG. 5(*b*) is its top cross sectional view. The same symbols are given to the same parts as those shown in FIG. 2. Some parts of the structure are omitted.

The hybrid mixer 2 according to the present embodiment, as seen in FIG. 5(*a*), has the same side cross sectional view as that of the first embodiment shown in FIG. 2. However, it differs from the hybrid mixer of the first embodiment, as shown in FIG. 5(*b*), in that a second screw feeder 45 is horizontally provided in parallel with a lateral screw feeder 32 inside a cylindrical body 31.

This second lateral screw feeder 45 extends from the end of the cylindrical body 31 to the vicinity of the inlet of a mixer body 30 and is coupled to the lateral screw feeder 32 by a rotary shaft 34 and a gear 46 so that both lateral screw feeders are interlocked. As the means for coupling, a belt may be used.

Fly ash supplied via a rotary valve 51 from a hopper 50 is thrown between the two lateral screw feeders 32 and 45.

This structure ensures that the fly ash from the hopper 50 can be supplied to the mixer body 30 by the second lateral screw feeder 45 even if, for example, fly ash becomes wet and adheres to the lateral screw feeder 34, resulting in clogging.

Figure 6:
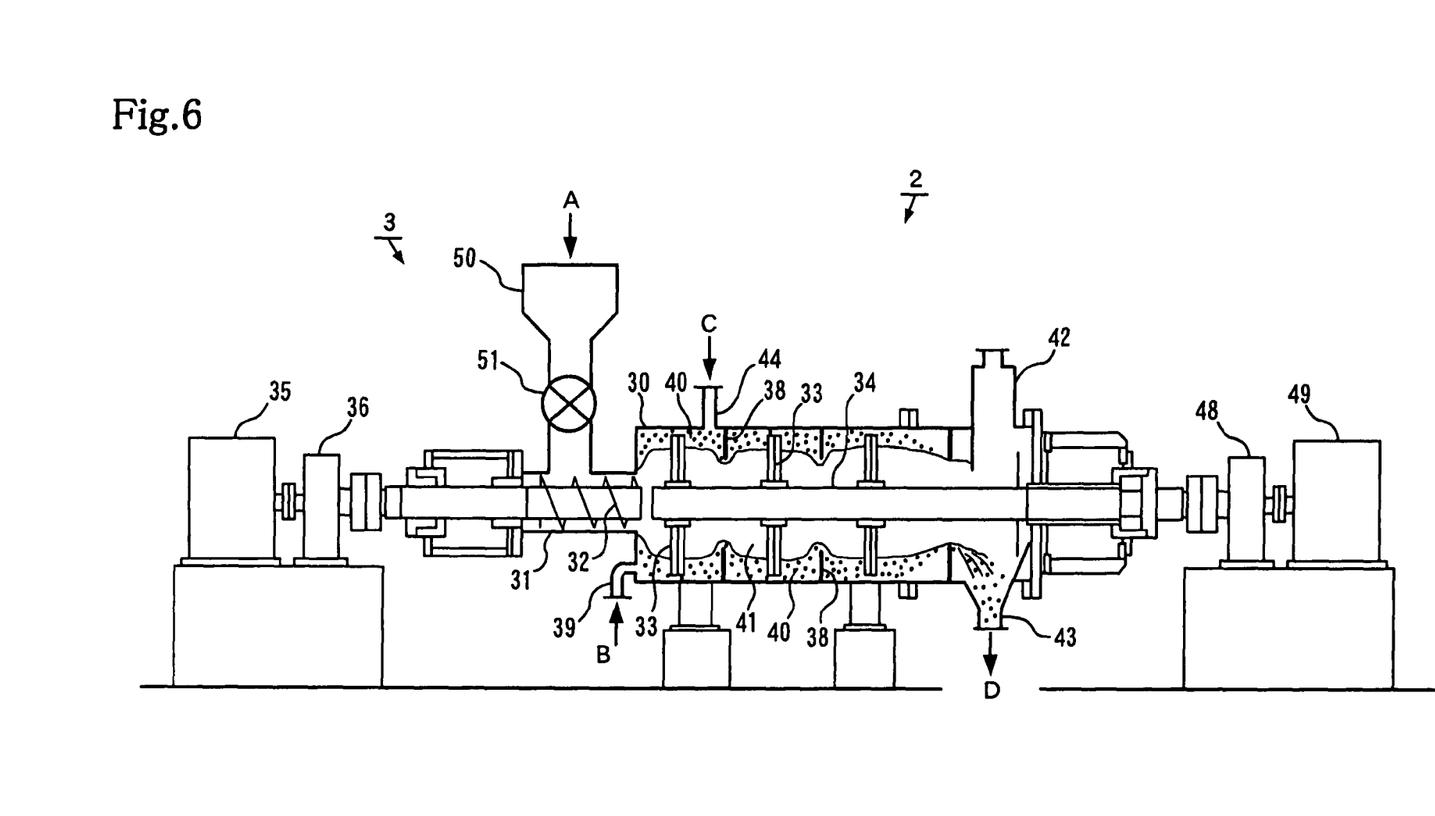
FIG. 6 is a cross sectional view illustrating a structure of a hybrid mixer shown in FIG. 1, according to a fourth embodiment.

FIG. 6 shows a hybrid mixer 2 according to a fourth embodiment. FIG. 6 shows a cross sectional view illustrating a structure of the hybrid mixer 2 according to the fourth embodiment and the same symbols are given to the same parts as those shown in FIG. 2.

The hybrid mixer 2 according to the present embodiment is characterized in that a lateral screw feeder 32 in a cylindrical body 31 is not coupled to a rotary shaft 34 on which stirring blades 33 are mounted in a mixer body 30 and they rotates separately in such a way that the lateral screw feeder 32 is rotated by an electric motor 35 and the rotary shaft 34 is rotated by an electric motor 49.

Since this structure enables slurry 40 to be prepared in the mixer body 30 regardless of the amount of fly ash A supplied to a hopper 50, the amount and concentration of the slurry can be easily adjusted depending on the operating status of plant equipment on the downstream side that processes slurry D to which a shearing force was applied, thus helping to streamline the operation of the plant.

An adjusting tank 7 is provided for adding a foaming agent supplied via a pump 9 from a foaming agent tank 8 to the slurry discharged from the hybrid mixer 2 and mixing them with stirring blades, thus causing the slurry to be in a state liable to generate air bubbles.

A floatation unit 11 is provided for separating unburned carbon in such a way that it stirs slurry fed via a pump 10 to take in air in the atmosphere, generating air bubbles and causing the unburned carbon to attach to those air bubbles and float on with them. Furthermore, the amount of air bubbles to be generated can be adjusted by blowing air into through the bottom part of the floatation unit 11 from an air feeder 12.

Unburned carbon separated as a floating substance in the floatation unit 11 is fed through a pipe 19 to a dehydrator 20 while slurry after having unburned carbon separated is recovered as sediment in the floatation unit 11 and fed via a pump 13 to a solid-liquid separator 14.

The solid-liquid separator 14 is provided for separating the slurry into fly ash and water. The separated fly ash is fed to a drier 15 as a cake while the separated water is returned through a circulation pipe 24 by a pump 23 to the hybrid mixer 2 to be reused as water for generating slurry.

A drier 15 is provided for drying the fly ash as a cake with hot air generated in a hot air furnace and the dried fly ash becomes fly ash 17, i.e. a product after having unburned carbon separated and is used as a cement admixture and the like.

A bag filter 16 is provided for filtering and collecting fine powder of fly ash generated during the drying process in the drier 15 to recover it. The recovered fly ash also becomes the fly ash 17 as a product.

A dehydrator 20 is provided for dehydrating the unburned carbon separated as a floating substance in the floatation unit 11. The dehydrator 20 includes a filter press by way of example. In a filter press, floating substances would be dehydrated through compression by a filter.

Dehydrated unburned carbon 22 can be used as fuel and a part of the unburned carbon 22 is supplied to the hot air furnace 18 as fuel and used for generating hot air for the drier 15.

Processes after the drier 15 can be left out depending on the required degree of dryness of fly ash.

The water separated in the dehydrator 20 is fed to a circulation pipe 24 and reused in the hybrid mixer 2 in the same manner as the above-mentioned water separated in the solid-liquid separator 14.

A method for separating unburned carbon from fly ash by using the above-mentioned system will now be described with reference to FIGS. 1 and 2.

Fly ash A is thrown from the fly ash tank 1 to the hopper 50 in the volumetric feeder 3 and the predetermined amount of the fly ash is cut off by operating the rotary valve 51, supplied to the cylindrical body 31 and then supplied to the mixer body 30 by the lateral screw feeder 32.

Water B is supplied from the water feeder 4 through a medium liquid supply port 39 to the mixer body 30 to prepare slurry 40. The concentration of the slurry is preferably within a range of 10 to 40 weight percent.

After that, a capturing agent C is added from the capturing agent tank 5 through a capturing agent port 44 to the slurry 40. If, for example, kerosene is used as the capturing agent, the amount of the capturing agent is preferably within a range of 0.01 to 3.0 weight percent of solid content in slurry.

A high shearing force is applied to the slurry 40 by sufficiently mixing and stirring them with the stirring blades 33. This high shearing force enables the surface of unburned carbon contained in solid-liquid mixture to be modified, thus increasing the affinity of the unburned carbon to a capturing agent, resulting in improving the floatability of the unburned carbon in the floatation unit 11 used as a later process.

In order efficiently to mix and stir the slurry, the total volume of the fly ash, water and the capturing agent is preferably within a range of 40 to 90 percent of the internal volume of the mixer body 30.

Thus, the slurry D to which a high shearing force was applied is fed to the adjusting tank 7 where adding a foaming agent and mixing them cause the slurry D to be in a state liable to generate air babbles. Then in the floatation unit 11, the unburned carbon is separated by stirring the slurry to takes in air, thus making the unburned carbon and the capturing agent attach to air bubbles and float on with them.

Since the unburned carbon separated as a floating substance in this manner contains a large amount of moisture, it is dehydrated in the dehydrator 20 for fuel use.

In addition, the slurry after having the unburned carbon separated is recovered as sediment; water is separated from the slurry in the solid-liquid separator 14; and the obtained slurry is dried in the drier 15 to obtain the fly ash 17 as a product. The yield of the fly ash 17 as a product can be increased by recovering fly ash remaining in fine powder form in the drier 15, using the bag filter 16.

The water separated in the solid-liquid separator 14 and the dehydrator 20 is fed through the circulation pipe 24 to the hybrid mixer 2 to be reused as water for generating slurry.

Figure 7:
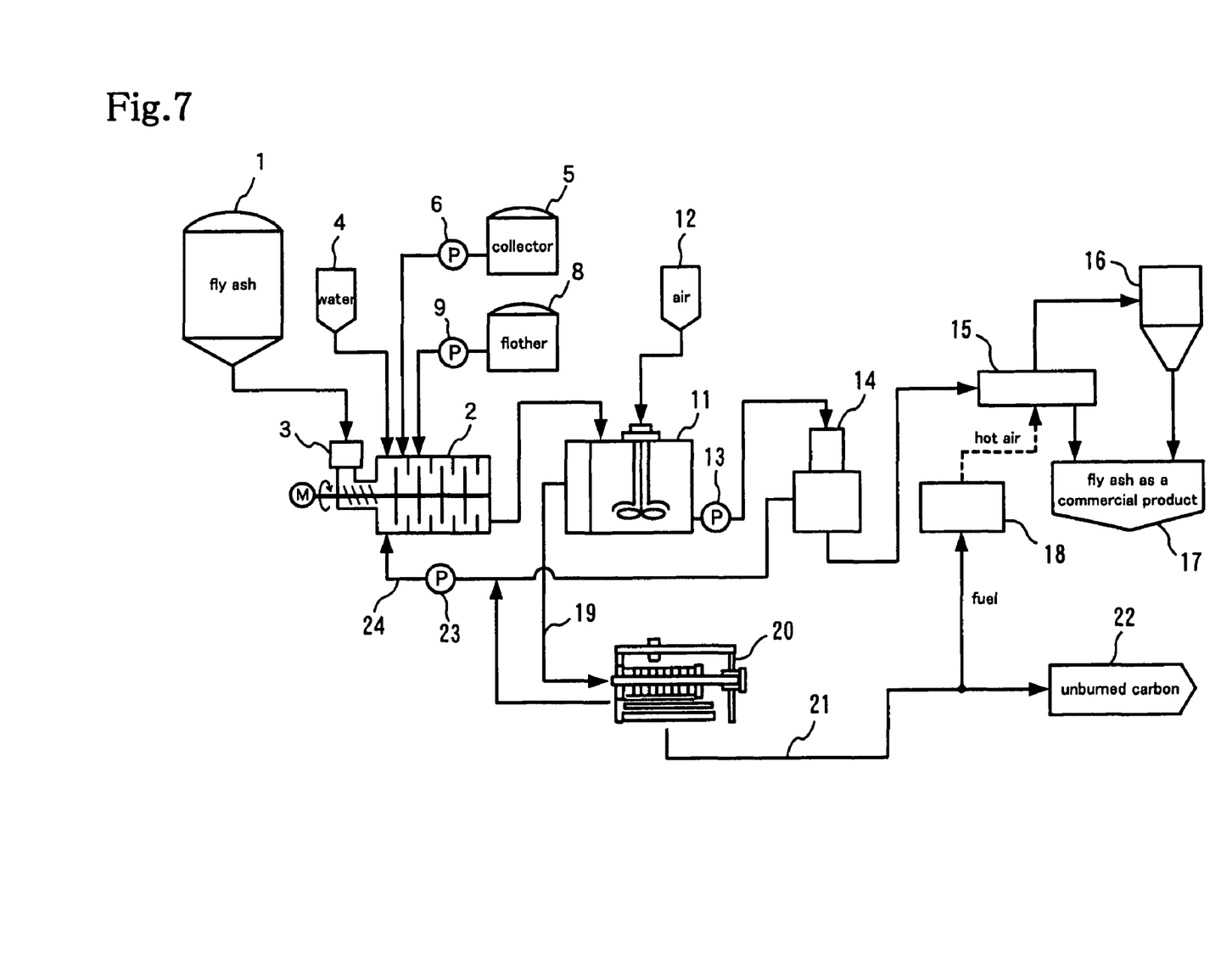
FIG. 7 is a schematic diagram of a plant system according to another embodiment of the present invention.

FIG. 7 shows a schematic diagram of a plant system according to another embodiment of the present invention and the same symbols are given to the same parts as those shown in FIG. 1.

In the present embodiment, an adjusting tank 7 is not required since a foaming agent is added in the hybrid mixer 2.

FIG. 8 shows an example of a structure of the hybrid mixer 2 according to the embodiment. FIG. 8 shows a cross sectional view illustrating a structure of the hybrid mixer 2 according to the embodiment and the same symbols are given to the same parts as those shown in FIG. 2.

This hybrid mixer 2 has the same basic structure as that of the hybrid mixer 2 shown in FIG. 2. However it differs from the hybrid mixer shown in FIG. 2, in that a mixer body 30 is provided with a foaming agent supply port 49 for adding a foaming agent from a foaming agent tank 8. Although the basic structure is described as the hybrid mixer 2 of the first embodiment shown in FIG. 2, it should be understood that the hybrid mixer 2 according to the second to fourth embodiments shown FIGS. 4 to 6 may also be provided with the foaming agent supply port 49.

By using the hybrid mixer 2 having such a structure, adding a foaming agent and mixing them can be performed in the hybrid mixer 2, thus enabling an adjusting tank 7 to be eliminated and plant equipments to be further streamlined.

What is claimed is:

1. A method for removing unburned carbon from fly ash the method comprising steps of:
   preparing slurry by mixing the fly ash and water in a hybrid mixer,
   applying a shearing force to the slurry while adding a capturing agent thereto, and
   separating the unburned carbon from the fly ash by flotation in such a way that the slurry to which a shearing force was applied is stirred while supplying air thereto after adding a foaming agent the slurry; wherein
   the hybrid mixer comprises:
   a lateral cylindrical mixer body, a cylindrical body that communicates with one end of the mixer body and a volumetric feeder that communicates with the cylindrical body and is erected thereon,
   the mixer body having:
   a rotary shaft on which a plurality of stirring blades are mounted at constant intervals,
   baffle plates disposed on inner surface of the mixer body in such a way
   that each baffle plate is located between the stirring blades,
   supply ports that supply water and a capturing agent into the mixer body respectively, and
   an exhaust air port and a discharge port on the other end of the mixer body
   the cylindrical body having:
   a first screw feeder coupled to the rotary shaft, and
   a second screw feeder disposed in parallel with the first screw feeder and having a communication part with the mixer body as the end thereof,
   wherein fly ash is supplied to the cylindrical body by the volumetric feeder, the supplied fly ash is fed into the mixer body by the screw feeder, the fed fly ash is mixed and stirred between the stirring blades and the baffle plates after adding the water and the capturing agent thereto, and then is discharged through the discharge port.

2. A method for removing unburned carbon from fly ash, the method comprising steps of:
   preparing slurry by mixing the fly ash and water in a hybrid mixer,
   applying a shearing force to the slurry while adding a capturing agent and a foaming agent to the slurry, and
   separating the unburned carbon from the fly ash by flotation by stirring the slurry to which a shearing force was applied while supplying air thereto; wherein
   the hybrid mixer comprises:
   a lateral cylindrical mixer body, a cylindrical body that communicates with one end of the mixer body and a volumetric feeder that communicates with the cylindrical body and is erected thereon,
   the mixer body having:
   a rotary shaft on which a plurality of stirring blades are mounted at constant intervals,
   baffle plates disposed on inner surface of the mixer body in such a way
   that each baffle plate is located between the stirring blades,
   supply ports that supply water and a capturing agent into the mixer body respectively, and
   an exhaust air port and a discharge port on the other end of the mixer body
   the cylindrical body having:
   a first screw feeder coupled to the rotary shaft, and
   a second screw feeder disposed in parallel with the first screw feeder and having a communication part with the mixer body as the end thereof,
   wherein fly ash is supplied to the cylindrical body by the volumetric feeder, the supplied fly ash is fed into the mixer body by the screw feeder, the fed fly ash is mixed and stirred between the stirring blades and the baffle plates after adding the water, the capturing agent and the foaming agent thereto, and then is discharged through the discharge port.

3. The method for removing unburned carbon from fly ash according to claim 1 or 2,
   wherein the volumetric feeder is composed of a hopper for receiving fly ash and a rotary valve for cutting off the fly ash from the hopper.

4. The method for removing unburned carbon from fly ash according to claim 1 or 2,
   wherein the volumetric feeder is a screw feeder erected on the cylindrical body.

* * * * *